Oct. 4, 1932.  H. O. JENKINS  1,881,194
HOG FEEDING TROUGH HANDLING DEVICE
Filed Oct. 23, 1931    2 Sheets-Sheet 1
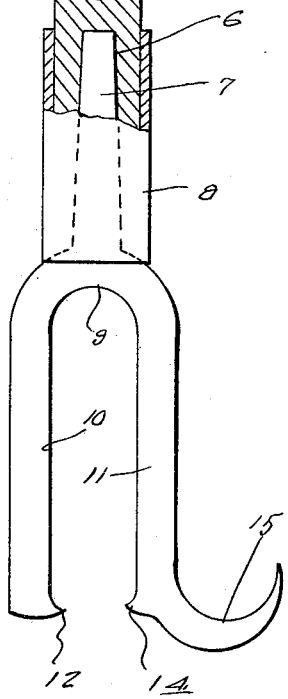
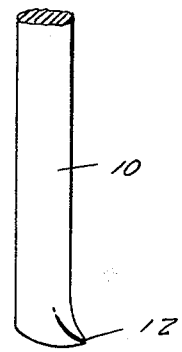
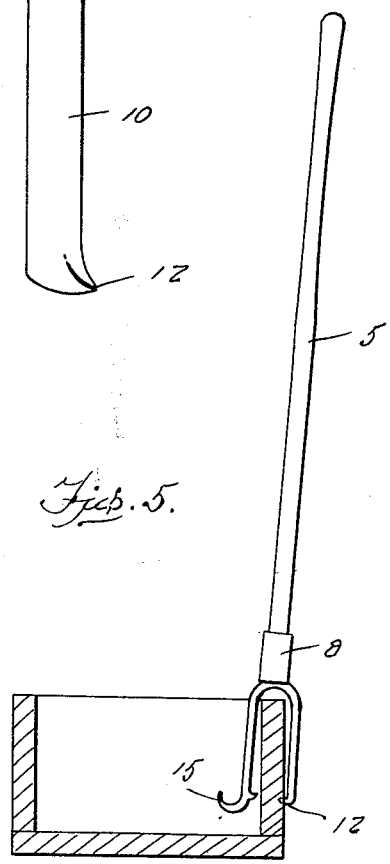
Inventor
H. O. Jenkins
By Clarence A. O'Brien
Attorney Oct. 4, 1932.  H. O. JENKINS  1,881,194
HOG FEEDING TROUGH HANDLING DEVICE
Filed Oct. 23, 1931  2 Sheets-Sheet 2
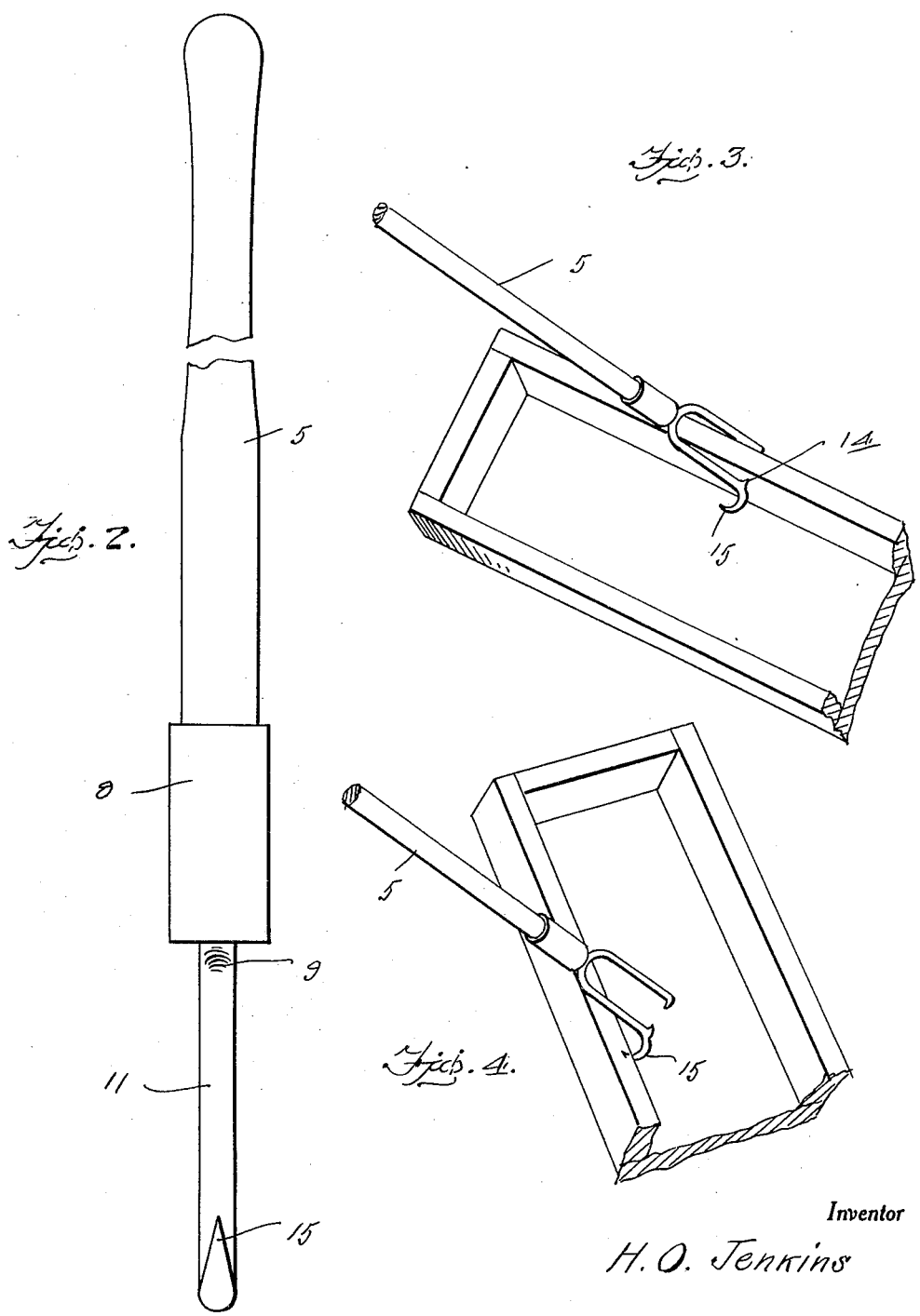
Inventor
H. O. Jenkins
By Clarence A. O'Brien, Attorney Patented Oct. 4, 1932

1,881,194

UNITED STATES PATENT OFFICE

HAROLD O. JENKINS, OF PLATTEVILLE, WISCONSIN

HOG FEEDING TROUGH HANDLING DEVICE

Application filed October 23, 1931. Serial No. 570,740.

The present invention relates to a device for handling hog feeding troughs and has for its prime object to provide a device of this nature which is exceedingly simple in its construction, easy to manipulate, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a sectional elevation of the device embodying the features of my invention.

Figure 2 is an elevation thereof taken at right angles to that shown in Figure 1.

Figures 3, 4 and 5 are views of the device in conjunction with a trough to illustrate the utility of the device.

Figure 6 is a perspective view of an end of one of the tines.

Referring more in detail to the drawings it will be seen that numeral 5 denotes an elongated handle formed with a recess 6 at one end to receive a shank 7 which is held in place by a ferrule 8. On the shank 7 is formed a U-shaped body including a bight 9 with a pair of spaced parallel coextensive tines 10 and 11. The tines 10 and 11 have at their ends inwardly directed pointed nibs 12 and 14 respectively. On the end of the tine 11 there is formed an outwardly curved hook 15 which is pointed at its extremity.

This device will be useful in three different operations. It will turn across or on its side for cleaning when engaged on the trough as shown in Figure 5 and in the same manner as indicated in Figure 3 and may be used to lift the trough off of the floor or pull a trough along the floor.

To turn the trough on its side you slip the fork over the side of the trough and push on the handle which causes the hook or nib 15 to bite into the side of the trough which keeps it from slipping off while the trough is being turned on its side. To lift a trough off of the floor the U-shaped body is slipped over the side and the handle is pushed the opposite way which is away from the trough which causes the hook or nib 12 to bite into the side of the trough. The trough can then be lifted off of the floor. To slide the trough along the floor the operator merely uses the hook 15 as is shown in Figure 4.

It is thought that the construction, utility and advantages of the invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A device of the class described including a U-shaped body formed with a bight and a pair of parallel tines, the tines terminating in inwardly directed pointed nibs, and one of the tines being formed at its end with an outwardly curved hook sharpened at its outer end, a shank projecting from the bight in opposite direction to the tines, a handle connected to said shank.

In testimony whereof I affix my signature.

HAROLD O. JENKINS.